United States Patent
Tidd et al.

(10) Patent No.: US 9,121,711 B2
(45) Date of Patent: Sep. 1, 2015

(54) ENVIRONMENTAL AWARENESS FOR IMPROVED POWER CONSUMPTION AND RESPONSIVENESS IN POSITIONING DEVICES

(71) Applicant: CSR Technology Inc., Sunnyvale, CA (US)

(72) Inventors: James Burgess Tidd, Stockholm (SE); Dimitri Rubin, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 57 days.

(21) Appl. No.: 13/832,825

(22) Filed: Mar. 15, 2013

(65) Prior Publication Data

US 2014/0278054 A1 Sep. 18, 2014

(51) Int. Cl.
*G01C 21/00* (2006.01)
*G01C 21/20* (2006.01)

(52) U.S. Cl.
CPC .............. *G01C 21/00* (2013.01); *G01C 21/206* (2013.01)

(58) Field of Classification Search
CPC .... G01C 21/165; G01C 21/30; G01S 5/0263; G01S 19/49
USPC ......................................... 701/409, 472, 491
See application file for complete search history.

(56) References Cited

U.S. PATENT DOCUMENTS

| 2005/0116823 | A1 | 6/2005 | Paulsen et al. |
| 2006/0170591 | A1 | 8/2006 | Houri |
| 2010/0033338 | A1* | 2/2010 | Sverrisson ................. 340/686.1 |
| 2010/0138147 | A1 | 6/2010 | T'Siobbel |

FOREIGN PATENT DOCUMENTS

| WO | WO 2010/015854 | 2/2010 |
| WO | WO 2012/057256 | 5/2012 |

OTHER PUBLICATIONS

GB Search Report for GB Appln. No. 1400088.9, dated Mar. 18, 2014.

* cited by examiner

*Primary Examiner* — John Q Nguyen
*Assistant Examiner* — Anshul Sood
(74) *Attorney, Agent, or Firm* — RatnerPrestia

(57) ABSTRACT

A system and method for switching a positioning device between using a first positioning technology and using a second positioning technology includes determining a location of the positioning device based on the first positioning technology, determining environment information corresponding to the location of the positioning device, and determining a location of a boundary where switching from the first positioning technology to the second positioning technology should occur. The method also includes switching from the first positioning technology to the second positioning technology prior to the positioning device crossing the boundary.

27 Claims, 7 Drawing Sheets

ENVIRONMENTAL AWARENESS FOR IMPROVED POWER CONSUMPTION AND RESPONSIVENESS IN POSITIONING DEVICES

The present invention is directed to a system and method for improving power consumption and responsiveness of positioning devices that employ multiple positioning technologies. In general, the positioning device of the present invention uses environmental information (e.g. received signals, sensor signals, etc.) to predict when a switch between positioning technologies is beneficial. Switching to a new positioning technology may be performed dynamically prior to the positioning device crossing a spatial boundary.

BACKGROUND

In some conventional systems, multiple positioning technologies may be employed. Efficiently choosing between the positioning technologies may be difficult. These conventional systems provide assistance information to positioning devices. This assistance, however, is focused on individual positioning technology and not on how to switch between technologies. Due to this limitation, positioning devices typically do not have access to information that would allow them to make informed decisions about which technologies to use and how to use them.

SUMMARY

A system and method for switching a positioning device between using a first positioning technology and using a second positioning technology. The method includes determining a location of the positioning device based on the first positioning technology, determining environment information corresponding to the location of the positioning device, and determining a location of a boundary where switching from the first positioning technology to the second positioning technology should occur. The method also includes switching from the first positioning technology to the second positioning technology prior to the positioning device crossing the boundary.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1A:
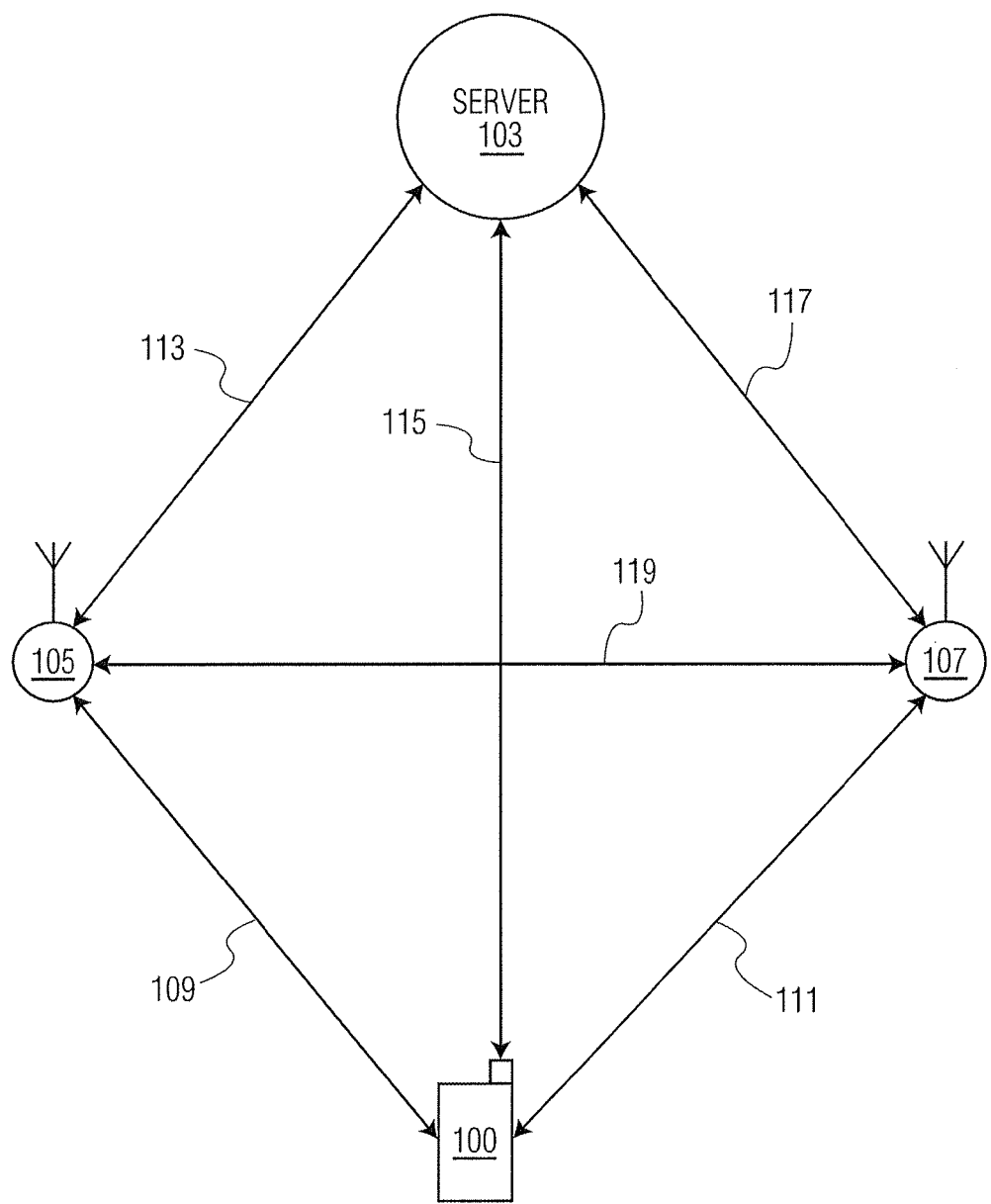
FIG. 1A is a block diagram showing communication between a mobile positioning device, two access points and a server, according to an embodiment of the present invention.

FIG. 1A shows an example of a communication network including mobile positioning device 100, access points 105 and 107 and centralized server 103. In general, these devices communicate with each other via communication paths 109, 111, 113, 115, 117 and 119 respectively. Although only one mobile positioning device, one server and two access points are shown, it is contemplated that the communication network could include a plurality of mobile positioning devices, a plurality of access points and a plurality of servers.

It is also noted that paths 113, 115 and 117 may be optional in embodiments where server 103 is not utilized. Furthermore, paths 109 and 111 may also be uni-directional in embodiments where device 100 receives signals from the access points but does not transmit signals to the access points.

In general, mobile positioning device 100 (e.g. a mobile telephone) travels in proximity to access points 105 and 107 (e.g. Wi-Fi access points that provide access to other devices, computers and severs over local networks and the Internet). Mobile positioning device 100 attempts to determine its location based on its previously known location, signals received from access points 105 and 107 and signals generated by internal sensors.

In one example, mobile positioning device 100 may measure received signal strengths of RF signals transmitted by the access points 105 and 107. These measurements along with other measurements from other access points and from motion and environmental sensors may then be transmitted to centralized server 103 which determines the absolute positions of the access points. This process of determining the absolute locations of the access points is known as relative harvesting, and is described in co-pending U.S. application Ser. No. 13/533,349 entitled "ACCESS POINT LOCATION IDENTIFICATION METHODS AND APPARATUS BASED ON ABSOLUTE AND RELATIVE HARVESTING" which is incorporated herein by reference.

In this example, mobile positioning device 100 may be monitoring RF signals transmitted by multiple access points (e.g., Wi-Fi and/or other RF transmitters). The mobile positioning device 100 may then identify each of the access points. As mobile positioning device 100 travels along a path, its location may be estimated using pedestrian dead reckoning (PDR). In one example, PDR is implemented by computing a relative displacement from an initially known location to other estimated locations along the path. Displacement between the locations may be determined based on various measurements of the transmitted access point RF signals (e.g. received signal strength indication (RSSI), time or phase offsets of received signals and/or round trip delay time (RTT)).

In general, data collection by mobile positioning device 100 may be performed at various points along the path and then transmitted from mobile positioning device 100 to server 103 (i.e. displacement information, signal strength information and identification information may be transmitted to the server). Server 103 may then process this received data to determine the absolute locations of the access points along the path.

In one example, mobile positioning device 100 may be traveling along a path within a building. In the building, wireless access points may be transmitting RF signals. Mobile positioning device 100, at various locations along a path, monitors the received RF signals transmitted from the access points. By using the various measurements described above, mobile positioning device 100 is able to compute its location by computing a displacement between the various locations along the path with reference to an initially known absolute location (i.e. an anchor). In one example, the anchor could be the last computed absolute position of mobile positioning device 100 (e.g. the last GPS fix before entering the building).

Mobile positioning device 100 may then transmit the collected data (i.e. displacement information, signal strength information and identification information) to server 103. Server 103 may then compute the absolute positions of the access points in an attempt to map the overall positioning network. These absolute positions of the access points are then transmitted to mobile positioning device 100 and other mobile positioning devices in the network. Mobile positioning device 100 may then use the absolute locations of the access points to more accurately determine its current location (i.e. RF signal strength received from the access point as well as the absolute access point location computed by the server could be used to determine the absolute location of the mobile positioning device).

Based on the absolute position information obtained when the mobile positioning device 100 was at the last GPS fix, the signal characteristic measurements at the points along the path and the displacement measurements, the server 103 may estimate locations for the points along the path. Using these positions, the server 103 may then estimate the positions of the access points by performing respective weighted centroid calculations using the signal characteristic measurements at the points along the path. Thus, it may obtain an estimate of the relative positions of the access points. It is noted that, according to one example embodiment, these centroid measurements are not used as the locations of the access points but are merely starting points for a calculation that determines the position more accurately, based on crowd-sourced information. The calculated positions of the points along the path as well as the centroid positions of the access points are only estimates because, for example, the mobile positioning devices 100 may not always have a clear signal path to the access points so the signal characteristic at one or more of the points along the path may be attenuated. In addition, if RTT or arrival time is used as a signal characteristic, the value calculated by the mobile positioning device 100 may be erroneous due to multipath. Furthermore, the sensor data for a particular device may not be properly calibrated. Crowd-sourcing is used as described below, to refine these estimates by combining multiple estimates from multiple mobile positioning devices 100, taken at different times and different locations.

In an example embodiment, estimating the access point location is formulated as a cost function minimization (which may be mapped to Maximum Likelihood) based on two terms. The first term is a sum over every Wi-Fi observation. This locates the access points in the regions having signal characteristics with high confidence levels. The second term ensures that the estimated true locations where the scans were made do not violate the constraints imposed by the absolute and relative harvesting. It is a sum over all the constraints present. The cost function is shown in Equation (1):

$$E = \Sigma_n (A_{i[n]} - U_{j[n]})^2 w^2(\text{RSSI}_n) + \Sigma_c (U_{k[c]} - \delta_{c,R} U_{l[c]} - \Delta_c)^T \Sigma_c^{-1} (U_{k[c]} - \delta_{c,R} U_{l[c]} - \Delta_c) \quad (1)$$

Where: U is the estimated location (e.g. x,y,z vector) at which a scan observation was made (i.e. an estimated location of a mobile positioning device 100); A is the estimated position of an access point; n is a sum over all observations of access points; c is a sum over all constraints (omitted for absolute locations); $\delta_{c,R}$ selects presence or absence of this variable according to whether the constraint is relative or absolute (e.g. Kronecker delta); $\Delta_c$, for absolute constraints, is the measured location and for relative constraint is the measured delta; i[n],j[n],k[c],l[c] are mappings from the observations and constraints to the relevant locations of the access points and points where the mobile positioning devices made the observations (i.e. A's and U's); $w^2(\text{RSSI}_n)$ is a weighting for an observation, which may be, for example a function of the signal strength (RSSI) of the monitored access point signal; $\Sigma^{-1}$ is a weighting for a constraint (in the example, this is a 3×3 matrix for each constraint); and T indicates the transpose of the vector. If RTT or some other measure of signal timing were used as a characteristic of the access points, an additional term may be added to the cost function to accommodate the variation in signal timing.

The above example cost function contains three variables for three unknown access point locations and three for each unknown mobile positioning device position at which a scan was obtained. Typically, this is therefore a minimization problem with hundreds, or thousands of unknowns. It is nevertheless tractable as the cost function and gradient are straightforward to calculate.

It is desirable to start the minimization from a good initial point. This may be obtained, for example, using the weighted centroids, described above, to obtain initial estimates of the access point locations and/or by iteratively solving sub-parts of the above problem. Additional outlier rejection checks may be applied at this stage based on the estimated locations obtained from the initial seed calculation.

The example cost function does not use the strictly quadratic (and consequently implied Gaussian) form above but may moderate its form for large errors by changing from quadratic to linear and then constant as the error increases. This process known is known as fat-tailing and flat-tailing.

Uncertainty (equivalently confidence/covariance) in the solution is obtained from the curvature of the cost function at the minimum. The Hessian matrix may be evaluated at the cost function minimum and its inverse yields the covariance matrix. Due to the large number of dimensions this may be an expensive operation. The complexity may be addressed by exploiting the dominantly local nature of the contributors (effectively the sparseness of the matrix) to allow the problem to be split into a series of smaller computationally cheaper calculations, each using a respective portion of the matrix.

Fingerprinting is a method that uses a model of the propagation pattern of each access point 105 and 107 to determine the likely location of a mobile positioning device 100. If the fingerprint of an access point were used as its positioning data, the model may be initialized with estimated position points in the area and their corresponding signal characteristic measurements. The cost function described above in equation (1) may be modified to minimize differences between the observations and the fingerprint model.

If additional anchors (i.e. absolute positions other than the last known GPS fix) within the building are able to be determined by mobile positioning device 100, then the overall accuracy of the harvesting would increase since these absolute positions could be included in the above described cost function. One way to determine additional anchors within the building is to utilize map information. In general, information of the architectural layout of the building (which is already known) may be utilized by server 103 in order to more accurately determine the location of mobile positioning device 100 and the locations of the access points.

Figure 1B:
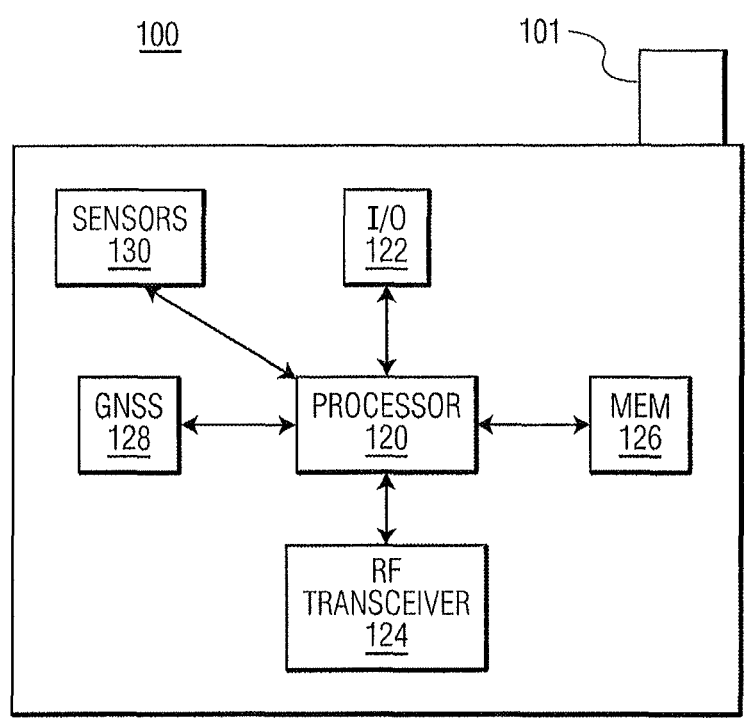
FIG. 1B is a block diagram of mobile positioning device, according to an embodiment of the present invention.

FIG. 1B shows an example of mobile positioning device 100 which may be embodied as a mobile device (e.g. a mobile telephone). Mobile positioning device 100 may include a processor 120 for controlling various other hardware or software modules. In one example, mobile positioning device 100 may include input and output devices 122 (i.e., keypad and display, not shown), memory 126, RF transceiver device 124 (e.g. Wi-Fi transceiver), a global navigation satellite system (GNSS) receiver 128, and internal sensors 130 (e.g. an accelerometer, gyroscope, pedometer, barometer, magnetometer, microphone and/or camera).

In one example, the RF transceiver 124 may be able to transmit and receive in various IEEE 802.11 standards. The GNSS receiver 128 may also be able to receive satellite signals, for example, from global positioning system (GPS) satellites. Both the GNSS receiver and the RF transceiver 124 may utilize antenna 101 which may be a common antenna or multiple separate dedicated antennas for transmitting and receiving in specific frequency bands.

In one embodiment, mobile positioning device 100 may utilize internal sensors to determine environmental and user dynamic context (i.e., if the mobile positioning device 100 is indoors/outdoors, traveling up a staircase, traveling in an elevator, walking, traveling in a vehicle, etc.). Once the environmental and user dynamic context information has been determined, mobile positioning device 100 may transmit this information to server 103. Server 103 may then adjust (i.e. correct) the locations of the access points based on map information. For example, the known locations (e.g. latitude and longitude) of the stairs, elevator, etc. may be used by the server device 103 as anchors in determining the locations of the access points.

Figure 1C:
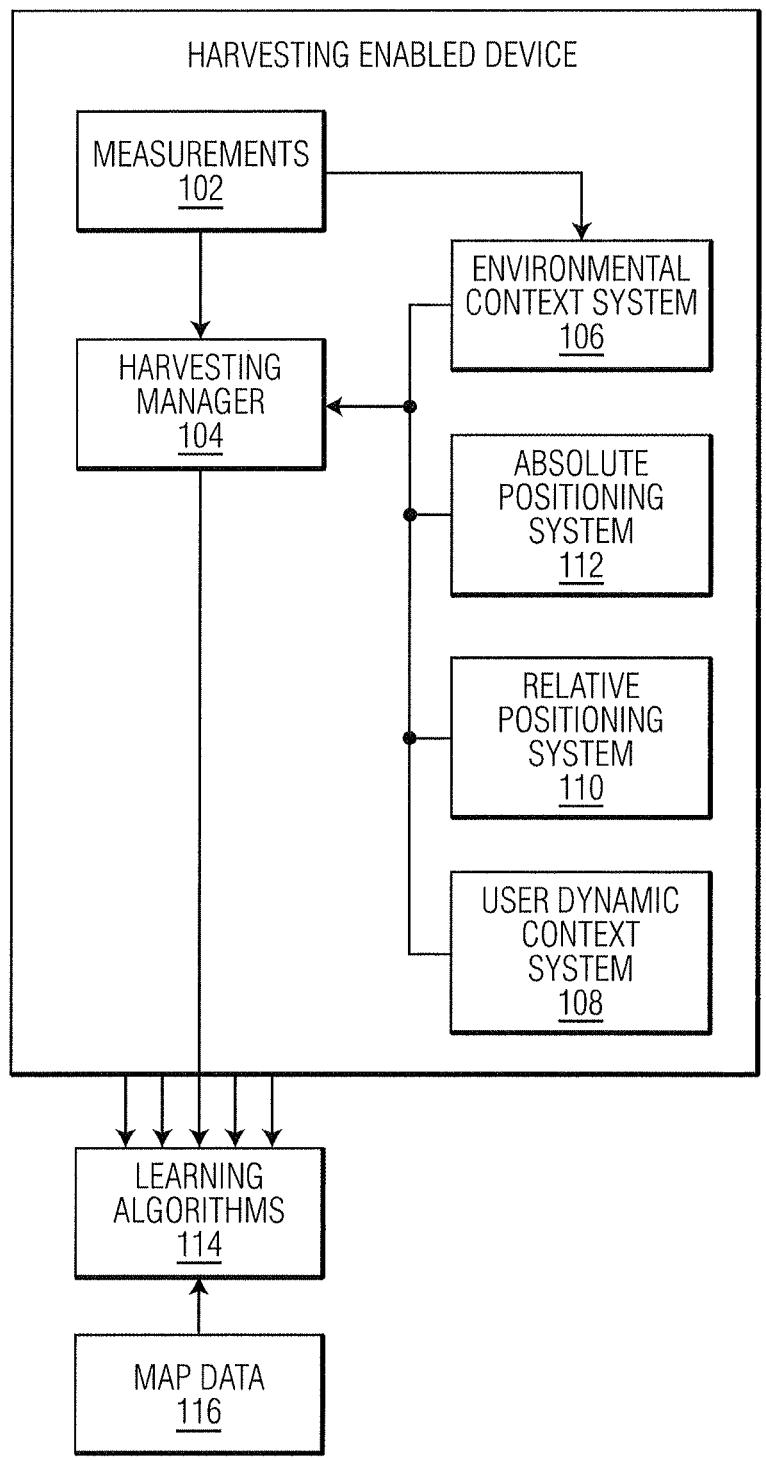
FIG. 1C is a block diagram of a processor in the server device, according to an embodiment of the present invention.

An embodiment of server 103 is shown in FIG. 1C where hardware and/or software modules may be implemented to determine the locations of the access points. Specifically, processor 120 may have module 102 for processing the measurements received from the internal sensors of mobile positioning device 100, environmental context system 106 for determining environmental context of the device (e.g., whether the device is indoors or outdoors), user dynamic context system 108 for determining traveling dynamics of the user (e.g., whether the user is traveling upstairs, in an elevator, in a vehicle, etc.), relative positioning system 110 for determining the relative position to the access points from the collected measurements and context data, absolute positioning system 112 for determine the absolute position, for example, based on the GNSS signals, harvesting manager 104, which determines the locations of the access points, learning algorithm module 114 which combines the harvesting information with the map information from map data module 116 to correct the locations of the access points. Although the server device 103 is shown as being separate from mobile positioning device 100, it is contemplated that mobile positioning device 100 could perform all of the functions of server device 103.

In one example, harvesting manager 104 may determine locations for a plurality of access points within a building. In order to obtain a better estimate of the access point locations, the learning algorithm may correlate the environmental and user dynamic context information that has been determined within the building with associated map data that may be used to define an anchor within the building.

For example, measurement module 102 may receive accelerometer measurements from mobile positioning device 100 indicating that mobile positioning device 100 is accelerating in a vertical direction. The environmental and user dynamic context modules 106 and 108 may then determine that the user is riding in an elevator within the building. The learning algorithm then utilizes this environmental and user context information to extract specific map data (i.e., the latitude and longitude) of the elevator which may be known due to architectural drawings of the building. Learning algorithm module 114 may then utilize this map information to adjust the estimated locations of the access points relative to the newly found absolute anchor position within the building. If multiple elevators are present, the learning algorithm may utilize the elevator closest to the estimated position.

In general, the mobile positioning device may utilize multiple positioning technologies (e.g., GNSS positioning, WiFi harvesting, WiFi fingerprinting and/or dead reckoning). Effectively switching between or among these technologies when determining location of the device, may be important to increase the responsiveness and efficiency of the mobile positioning device. Although it is contemplated that the positioning device may utilize other positioning technologies, and more than two positioning technologies, switching between GNSS and dead reckoning will be described with respect to the figures below. Some of the positioning technologies may include MEMs dead reckoning, WiFi trilateration, harvesting WiFi, and Finger Printing.

In general, it may be beneficial for the mobile positioning device to switch between positioning technologies. It may also be beneficial to perform this switch at specific locations or times to reduce power consumption and improve responsiveness of the positioning device. For example, a positioning device utilizing a GNSS positioning technology may benefit from switching to a dead reckoning positioning technology prior to entering a building where GNSS signals will not be available. The present system is able to predict when a transition between respective positioning technologies will occur as the mobile device is moving, and pre-emptively switch (i.e., initialize/calibrate), the appropriate positioning technology prior to the transition. Power consumption may also be reduced based on the characteristics of the device in a particular location. If, for example, the mobile positioning device is in a location having strong GNSS signals, then the rate at which the GNSS calculations are made may be reduced. This may include operating the device in a low-power mode by cycling the RF front end of the GNSS receiver on and off and/or increasing the time between fixes, for example, from one second to five seconds. Also, as described above, if the device senses that it is in an elevator, it may temporarily turn off both the GNSS and WiFi receivers because its location is known.

In one example, the mobile positioning device (while using GNSS positioning technology) may predict from its known position that it will be entering a building where GNSS signals are not available. Based on this prediction, the mobile positioning device may begin to calibrate dead reckoning sensors prior to the positioning device actually entering the building. This pre-emptive calibration increases the responsiveness of the mobile positioning device to a changing environment (i.e. the sensors will be ready to perform dead reckoning as soon as the mobile positioning device enters the building).

In another example, the positioning device traveling in the building (while using dead reckoning positioning technology) may predict that the mobile positioning device will exit the building. Based on this prediction, the mobile positioning device may begin initializing the GNSS positioning technology prior to the positioning device actually going outside (i.e. the GNSS receiver will be ready to perform global positioning as soon as the mobile positioning device leaves the building).

In general, there are two basic steps to switching among the technologies. First, the mobile positioning device (and potentially other mobile positioning devices) perform crowd-sourcing where information about the location environment is obtained. Second, this location environment information is then utilized by the positioning devices to assist in the switching among the various positioning technologies. These two basic steps are described below in more detail.

In the crowd-sourcing step, the positioning device as well as other mobile positioning devices determine environment information at specific locations. This location environment information may be obtained through various measurements taken by the mobile positioning devices. Some of these measurements may be performed by sensors on the mobile positioning devices, while other measurements may be based on physical characteristics of signals received by the mobile positioning devices.

For example, the mobile positioning device may measure various characteristics (e.g., strength, phase, multi-pathing, etc.) of RF signals transmitted from various transmitters (e.g. access points, satellites and other RF transmitters). The mobile positioning device may also utilize on board microelectromechanical systems (MEMS) sensors (e.g., accelerometers, magnetic field sensors, pressure sensors, etc.) to determine the location environment information. These measurements may be taken during and/or after the harvesting process described in respective FIGS. 1A-1C. The location environment information may also include map information and other information distributed from the server 103 in FIG. 1A. This information may also include a pre-calculated route from an initial position to a desired destination, for example, from a GNSS navigation system. Transitions among environments may be predicted using this route in a manner similar to using a map. Essentially, the location environment information is any information (measured or otherwise known) that may be utilized by the positioning system in determining when it would be best to switch between the positioning technologies.

Figure 1D:
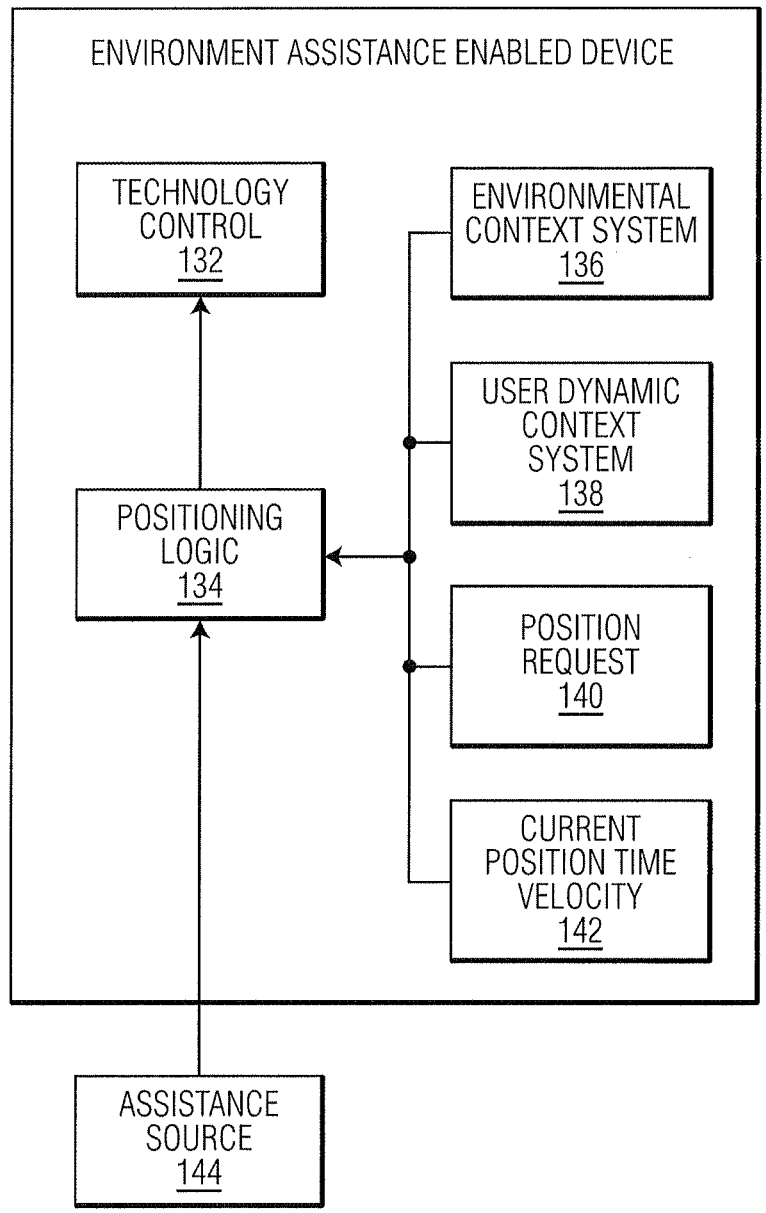
FIG. 1D is a block diagram of a processor in the mobile positioning device, according to an embodiment of the present invention.

In general, once the location environment information is obtained, the positioning system may then utilize this information for guiding the device (i.e., determining when a switch between a positioning technologies is beneficial). Shown in FIG. 1D is a block diagram of a mobile positioning device implementing multiple positioning technologies. Specifically, technology control 132 may be implementing various position technologies such as GNSS positioning and dead reckoning positioning. Positioning logic 134 includes hardware that is able to control the technology control 132 to switch based on detected information from sensors and receive signal strength from access points. The environment context system 136 may provide environmental information to the positioning logic (e.g. provide information of whether the positioning device is indoors or outdoors). The user dynamic context system 138 provides user context information (e.g., whether the user is walking or in a vehicle). The position request system 140 may include accuracy, time out and other criteria to help influence decision logic. The current, position, time and velocity system 142 may have a current estimate of the position/time/velocity information of the positioning device. The assistance source 144 may be information from an external source such as server 103. In general, the information from systems 136, 138, 140, 142 and 144 are utilized by position logic 134 in order to control (e.g., switch) between the multiple positioning technologies utilized by technology control 132.

Figure 2A:
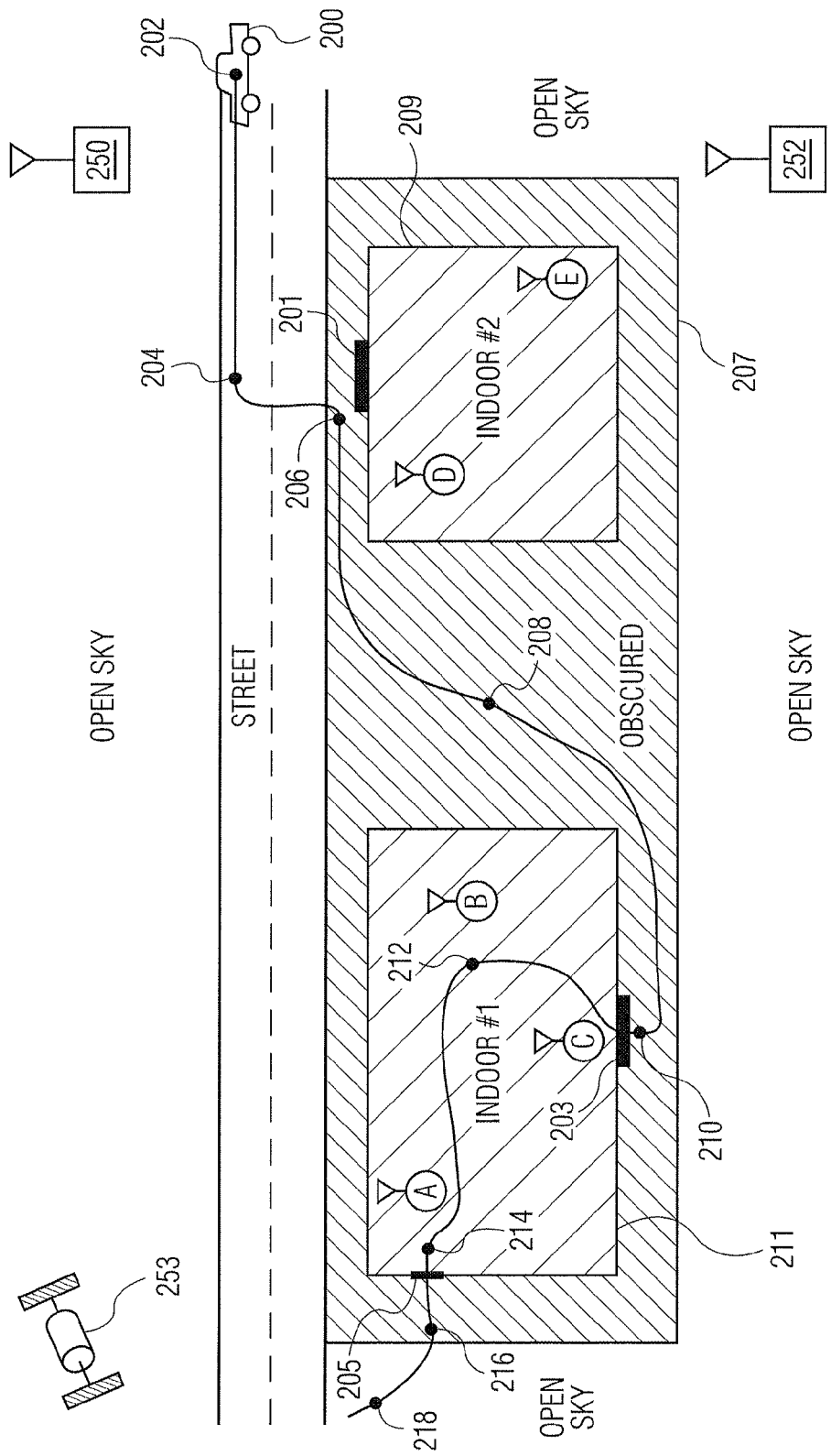
FIG. 2A is an aerial view of a mobile positioning device traversing a street including two buildings, according to an embodiment of the present invention.

An example of switching between technologies is described below with respect to FIG. 2A. Shown in FIG. 2A is an aerial view of a street with various open sky, obscured and indoor areas. Specifically, indoor area 1 and indoor area 2 may be buildings and the obscured areas may be sidewalks between the buildings where signal quality from satellites or other RF transmitters is poor.

In general, two examples will be described below with respect to FIG. 2A. In a first example, the mobile positioning device will be described collecting environment information and utilizing this environment information to switch between the mobile technologies. In a second example, the mobile positioning device will utilize an environment map to guide the switching among multiple positioning technologies.

In the first example, mobile positioning device B at location 202 is traveling in vehicle 201. The mobile positioning device may be determining received signal strength from RF broadcast transmitters 250, 252 and GNSS satellite 253. Mobile positioning device may also be obtaining sensed velocity and direction information of the vehicle. Based on this information, the mobile positioning device may be able to determine that it is traveling in a vehicle on the street. If this determination is made, the system may choose to implement GNSS positioning technology (i.e., GNSS signals are available since the street is in an open sky area). Depending on the signal strength, the device may adjust the rate at which GNSS fixes are obtained by selecting between a high-power mode and a low-power mode to balance positional accuracy against power consumption.

Assuming car 200 stops at position 204 and the user having the mobile positioning device gets out of the car, the sensor system may determine that the user has exited the vehicle based on the change in detected velocity or other factors. As the user walks, mobile positioning device moves from position 204 to 206. The mobile positioning device may measure the signal strength of signals transmitted from access point D and E in building #2. The mobile positioning device may also use map data that indicates that the mobile positioning device is moving towards the entrance 201 of known building #2. If the mobile positioning device continues towards entrance 201, the prediction that the user will enter building 2 may be made and therefore the positioning technology may switch from the GNSS system to a dead reckoning system (e.g. dead reckoning sensors could be calibrated in anticipation of entering the building).

However, since this example shows that the user makes a turn away from entrance 201 once the user reaches the sidewalk, the system may predict, based on the users heading, that the user will not enter the building. The system therefore will continue to utilize the GNSS system for navigation purposes. As the mobile positioning device moves towards position 208 (i.e. area obscured by the buildings), it may or may not continue to utilize the GNSS signal from satellite 253 or the RF signals transmitted from transmitters 250 and 252 for positioning purposes. This decision may be made based on whether the signals are obscured between buildings #1 and #2. If the GNSS signals are obscured, the mobile positioning device may increase the frequency of GNSS fixes or switch to an aided form of GNSS, to a dead reckoning using only MEMs sensors, or to WiFi harvesting using dead reckoning based on MEMs sensors in combination with received WiFi signal strengths.

As the mobile positioning device moves towards position 210, the positioning device may determine based on a location and the velocity/direction of the mobile device that the user is going to enter building #1 through entrance 203. The measured signal strengths of access points A, B and C may also be utilized to make this determination. The system may then calibrate the dead reckoning sensors at location 210 using the GNSS signals as a reference, and begin using dead reckoning and/or WiFi harvesting immediately upon entrance 203 of the building.

Once inside building #1, the mobile device may move to position 212 and then to position 214. The signal strength of the access points A, B and C may be used to navigate through the building. The signal strength of access point A (at location 214), may then indicate that the mobile positioning device is moving towards exit 205. In this case, the system may begin to switch from WiFi harvesting positioning to a GNSS technology since it knows that the positioning device will be exiting the building. Prior to exiting the building, the GNSS system could be initialized, for example, using stored aiding data so that once the positioning device moves outside of building #1 to positions 216 and 218, the system may immediately begin using GNSS positioning technology.

In general, when the mobile positioning device predicts that it will utilize a dead reckoning positioning technology, the device may turn QN and calibrate various sensor errors (e.g. ACC bias, gyro bias, mag bias, etc.) and motion errors (e.g. stride length, walking angle and the relation to the direction of travel of the user) in anticipation of switching from the GNSS technology to the dead reckoning or WiFi harvesting technology. If this switch is determined while the mobile positioning device is processing GNSS signals, the GNSS position may be used as a reference for calibration. Likewise, if the mobile positioning device predicts a switch to the GNSS technology, the mobile positioning device may ask for assistance from a server, locally extend ephemeris or start its acquisition process so that it begins tracking the GNSS signals at the point at which the indoor technology (e.g., access point signal strengths) start to produce uncertain position estimates.

Essentially, the mobile positioning device may predict that a switch between the positioning technologies would be beneficial. Based on this prediction, the mobile positioning device may then at least initiate/calibrate, etc. the positioning technology to which it will eventually switch to.

In the example described above, the mobile positioning device used received signals and sensor signals to determine a switch. In a second example, the information previously collected from the mobile positioning device and/or other mobile positioning devices may be harvested to produce an environment map (see FIG. 2B) which is then used to assist future mobile positioning devices when switching between the various positioning technologies. This may be achieved in the learning algorithms module shown in FIG. 1C.

An environment map (see FIG. 2B) could be similar to a contour plot on per technology basis. For example, the street and the surroundings may be defined as open sky areas where GNSS signals and other RF transmitted signals are not obstructed and therefore could be utilized by the mobile positioning device. The buildings may be defined as indoor area #1 and indoor area #2 where the GNSS signal and other external RF signals are not able to be received. The area surrounding building #1 and building #2 may be deemed as obscured areas where only some or weak external RF signals may be received. In one obscured area example, if the signals are obscured by the height of the buildings (e.g., if building #1 and building #2 are high rises), then the GNSS signal from, satellite 253 may not be able to be received properly or may include multi-path distortion.

If an environmental map is utilized or if the user has a defined route (not shown), then the mobile positioning device may utilize the map or route to determine when to switch between positioning technologies. For example, since the map in FIG. 2B indicates that positions 202 and 204 and 218 are in the open sky, a mobile positioning device may simply utilize the GNSS positioning technology at these locations. Since locations 206, 208 and 210 and 216 are in an obscured area, the mobile positioning device (before entering the obscured area) may switch to a different positioning technology (e.g., an assisted form of GNSS positioning). Since locations 212 and 214 are located indoors, then the mobile positioning device (before entering building #1) may switch or initialize the dead reckoning positioning technology. Similar methods may be used to control the device based on a predefined route provided, for example, by a GNSS navigation system.

Essentially, the environment map or route makes it easier for the mobile positioning device to determine when a switch is necessary. The mobile positioning device may simply track its location, velocity and direction in order to predict when it will cross a boundary of the map or route (e.g., crossing from open sky to the obscured area or from the obscured area to indoor area, etc.).

The environment map or route may or may not be utilized with other environmental information currently being measured by the mobile positioning device. For example, the mobile positioning device could simply utilize the map or route and its position as determined by the currently active positioning method, rather than measuring signal strength and sensing other environmental factors. In another example, the mobile positioning device could utilize the map or route information in conjunction with these other measured/sensed values.

The locations of the mobile device in FIG. 2A are shown as exact points. Boundaries 207, 209 and 211 of the various open sky obscured and indoor regions are also shown as an exact line. However, in actuality, each of these locations and boundary regions have a level of uncertainty. For example, shown in the map of FIG. 2B the locations of the mobile positioning device 202-218 may have a level of uncertainty such that the mobile device may be located anywhere within the ellipses shown. Likewise, boundaries 207, 209 and 211 separating the various regions of the map may also have an uncertainty such that the respective boundaries may exist anywhere within the shaded regions.

In general, this level of uncertainty may be taken into account when predicting when a switch between positioning technology should occur. For example, when the positioning device is at location 204, the positioning device is in an open sky area because the entire ellipse is in the open sky area. Thus, at location 204, the GNSS technology may be utilized. However, when the positioning device is at location 206, the ellipse overlaps the open sky area and the obscured area. Responsive to this determination, a determination may be made as to whether a switch should occur between the positioning technologies.

In one example, the amount (e.g. proportion of area) which the ellipse 206 is overlapping the boundary, the open sky area and obscured area may be utilized along with the velocity and heading of the mobile positioning device in determining when to switch between the positioning technologies. For example, if the ellipse overlaps boundary 207 and the velocity and heading indicates that the user is moving towards the indoor area #2, then the positioning technology may switch from the open sky GNSS positioning to another more appropriate positioning technology such as dead reckoning or assisted GNSS.

Similarly, at location 210, the ellipse overlaps both boundary 207 of the obscured area and the boundary 211 of the indoor area #1. The amount of overlap of these various areas as well as the velocity and heading of the device may similarly be utilized to determine whether a switch between positioning technologies is necessary.

Figure 2B:
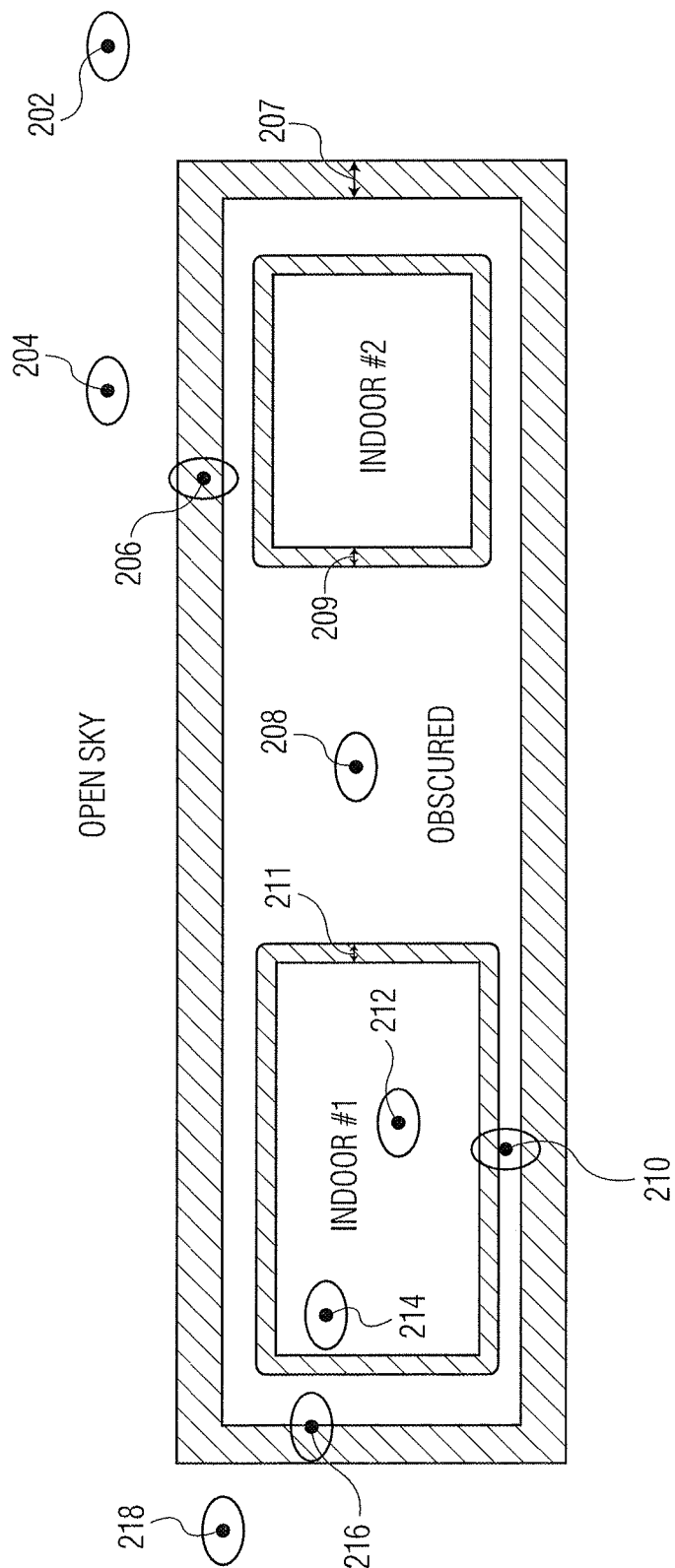
FIG. 2B is a diagram showing a footprint of the mobile positioning device location and a width of the switching boundary between the regions, according to an embodiment of the present invention.

It is noted that the ellipses shown in FIG. 2B can be generated by various methods. The shape/size of the ellipses may be determined based on at least one of the uncertainty of the mobile positioning device location, the heading/velocity of the mobile positioning device and a maximum likelihood area of the mobile positioning device. It is also noted that the shape may be other than elliptical. An environmental map or pre-defined route may reduce the level of uncertainty.

The following are two examples of switching between GNSS based positioning technology and Wi-Fi based dead reckoning positioning technology. In a first example, a position request may be made and the GNSS receiver activated. The measurements provided by the GNSS receiver may indicate that it is likely that the positioning device is indoors. The decision logic may then choose to turn OFF the GNSS receiver and turn ON the Wi-Fi receiver in order to perform positioning. In a second example, the positioning device enabled with GNSS, MEMS and Wi-Fi may request assistance from a server for GNSS and Wi-Fi. Part of the return information from the server may include the environment map. The device may travel from an environment which has good GNSS performance to an area with poor GNSS performance. The MEMS system, which could be powered OFF while GNSS is performing well may need to be calibrated prior to entering the building in order to allow for higher performance. Without an environment map to predict the loss of GNSS, the MEMS system may only be able to react to the change in environment and miss the opportunity to calibrate, resulting in greater position uncertainty inside the building. With the environment map and/or other environment information, this transition between the regions may be predicted and the system may be made ready for the change in signal conditions.

Figure 3:
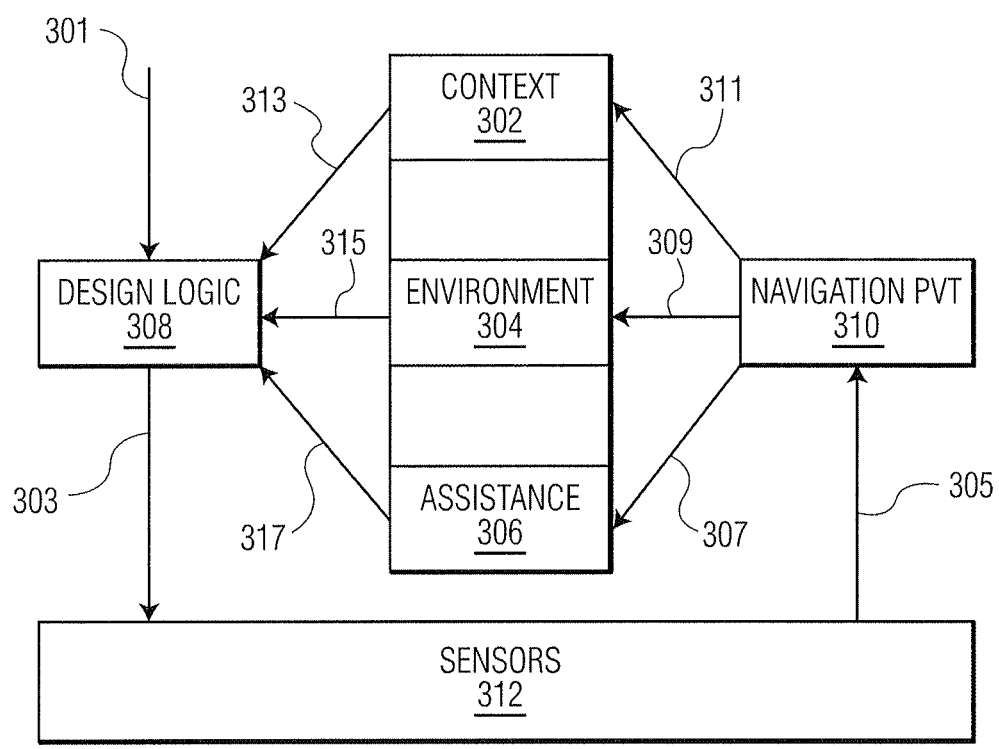
FIG. 3 is a block diagram showing the flow of information in the mobile positioning system, according to an embodiment of the present invention.

FIG. 3 is a block diagram showing the flow of information in one embodiment of the mobile positioning system via communication lines 301, 303, 305, 307, 309, 311, 313, 315 and 317. Specifically, decision logic 308 may send a measurement request 303 to sensors 312. Sensors 312 (e.g. WiFi sensors, MEMs sensors, GNSS sensors, etc.) may then send measurement data to navigation system 310. Context indicators 311, environment indicators 309 and position velocity, time and frequency, information 307 may then be sent to context system 302, environment system 304 and assistance system 306, respectively. Systems 302, 304 and 306 may then determine specific context information 313, environment information 315 and assistance information 317 that will be used to control a decision logic 308 in switching between the multiple positioning technologies.

Although the invention has been described in terms of a device that determines a geographical location, it is contemplated that it may have broader applications where various methods and/or devices may be used to determine a characteristic of a device. For example, a positioning device may be used to implement a geofence. Briefly, a geofence defines an area relative to the device such that the presence in, or absence from the area generates a trigger. Thus, the absolute location of the device is not as important as its position relative to the geofence. In another example, data from the positioning system may be used to determine the speed at which a device including the positioning system is moving. In this application, the position of the device is unimportant. The techniques described above may be used to reduce power consumption of devices that may receive GNSS, WiFi or environmental signals but that are not used to determine a location. A device that uses these signal sources to determine speed, for example, may greatly reduce the rate of its determinations or may change the equipment to be used when the sensed speed is far below a speed that causes an alarm indication. Thus, the same information, described above for conserving power of a location-determining positioning device may be used to aid extended operational modes of a positioning device that does not deliver location estimates.

In general, by being able to predict and pre-emptively switch between multiple positioning technologies, performance may be increased (e.g., accuracy and responsiveness may be increased and power consumption may be reduced). This allows the mobile positioning devices to utilize their resources more effectively in order to pre-empt a switch rather than just reacting to a degradation in signals and performing a switch.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for switching a positioning device between a first positioning technique in a first region and a second positioning technique in a second region, the method comprising:
   determining, by the positioning device, a first area of uncertainty surrounding a location of the positioning device in the first region based on the first positioning technique;
   determining, by the positioning device, environment information corresponding to the location of the positioning device;
   determining, by the positioning device, a second area of uncertainty surrounding a switching location in the first region at which switching from the first positioning technique to the second positioning technique should occur;
   determining, by the positioning device, a heading of the positioning device;
   switching, by the positioning device, between the first positioning technique and the second positioning technique, based on the environment information when the positioning device is at the switching location, based on a proportional amount by which the first area overlaps the second area, and based on the heading of the positioning device.

2. The method of claim 1, wherein:
   the first and second positioning techniques use respectively different first and second positioning technologies.

3. The method of claim 2, including:
   determining an environment map based on the environment information, the environment map having the first region and second region separated by the second area of uncertainty indicating a boundary between the two region,
   determining, by the positioning device, the first area of uncertainty surrounding the location of the positioning device on the environment map;

predicting, by the positioning device, when the positioning device will enter the second region based on the proportional amount by which the first area of uncertainty overlaps the second area of uncertainty; and switching, by the positioning device, between the first positioning technology and the second positioning technology prior to the positioning device crossing the second area of uncertainty surrounding the boundary.

4. The method of claim 2, including:
determining, while using the second positioning technology, the location of the positioning device based on information received from sensors on the positioning device.

5. The method of claim 2, including:
determining, while using the first positioning technology, the environment information based on physical properties of radio frequency (RF) signals received by the positioning device.

6. The method of claim 2, including:
switching between the first positioning technology and the second positioning technology by predicting that the positioning device will cross the second area of uncertainty surrounding the boundary based on the location and a velocity of the positioning device, and based on the proportional amount by which the first area overlaps the second area.

7. The method of claim 2, including:
predicting that the positioning device will cross the boundary; and
in response to the prediction, calibrating sensors used by the second positioning technology prior to switching between the first positioning technology and the second positioning technology.

8. The method of claim 2, including:
predicting that the positioning device will cross the boundary; and
in response to the prediction, automatically initializing a global navigation satellite system (GNSS) used by the first positioning technology prior to switching between the second positioning technology and the first positioning technology.

9. The method of claim 1, wherein the first and second positioning techniques use a single positioning technology in respective first and second modes having respectively different power consumptions.

10. The method of claim 9, wherein the single positioning technology uses a global navigation satellite system (GNSS) and the first and second modes calculate position fixes at respectively different rates.

11. The method of claim 1, including:
preventing switching, by the positioning device, between the first positioning technique and the second positioning technique, when the positioning device is at the switching location, based on the amount by which the first area overlaps the second area, and based on the heading of the positioning device.

12. A positioning device for switching between a first positioning technology in a first region and a second positioning technology in a second region, the positioning device comprising:
a transceiver for receiving and transmitting wireless signals to and from other wireless devices and for providing the received signals to one of the first and second positioning technologies;
sensors for sensing environment information and for providing environmental signals to at least one of the first and second positioning technologies; and
a processor configured to:
determine a first area of uncertainty surrounding a location of the positioning device in the first region based on signals received by the first positioning technology;
determine environment information corresponding to the location of the positioning device, based on signals received from the transceiver or sensors;
determine a second area of uncertainty surrounding at least one boundary between the first region and the second region where switching from the first positioning technology to the second positioning technology should occur;
determining a heading of the positioning device;
switch between the first positioning technology and the second positioning technology when the positioning device is at the boundary, based on a proportional amount by which the first area overlaps the second area, and based on the heading of the positioning device.

13. The device of claim 12, wherein the processor is further configured to:
determine an environment map based on the environment information, the environment map having the first region and the second region separated by the second area of uncertainty indicating a boundary between the two regions,
determine the first area of uncertainty surrounding the location of the positioning device on the environment map;
predict when the positioning device will enter the second region based on the proportional amount by which the first area of uncertainty overlaps the second area of uncertainty; and
control the positioning device to switch between the first positioning technology and the second positioning technology prior to the positioning device crossing the second area of uncertainty surrounding the boundary.

14. The device of claim 12, wherein the processor is further configured to:
determine a navigation route based on a position of the device and a desired destination, the route traversing first region and the second region separated by second area of uncertainty surrounding the boundary,
determine the location of the positioning device on the route;
predict when the positioning device will cross second area of uncertainty surrounding the boundary; and
control the positioning device to switch between the first positioning technology and the second positioning technology prior to the positioning device crossing second area of uncertainty surrounding the boundary.

15. The device of claim 12, wherein
the sensors include an accelerometer, and
the processor is further configured to:
determine the location of the positioning device based on signals received from the accelerometer.

16. The device of claim 12, wherein
the processor is further configured to:
determine the environment information based at least one of signal strength, frequency, and phase of radio frequency (RF) signals received by the transceiver of the positioning device.

17. The device of claim 12, wherein
the sensors include a GNSS receiver and dead reckoning sensors, and
the processor is further configured to:

switch between the first positioning technology and the second positioning technology by predicting that the positioning device will cross the second area of uncertainty surrounding the boundary based on the location and a velocity of the positioning device determined based on the signals provided by at least one of the GNSS sensors and dead reckoning sensors.

18. The device of claim 12, wherein the first positioning technology is configured to receive signals from GNSS sensors, the second positioning technology is configured to receive signals from dead reckoning sensors, and the processor is further configured to:

power on and calibrate sensor errors of sensors used by the second positioning technology for dead reckoning prior to switching between the first positioning technology and the second positioning technology.

19. The device of claim 12, wherein the first positioning technology is configured to receive signals from dead reckoning sensors, the second positioning technology is configured to receive signals from GNSS sensors, and the processor is further configured to:

power on and initialize the GNSS sensors used by the second positioning technology prior to switching between the first positioning technology and the second positioning technology.

20. The device of claim 12, wherein:

the processor is further configured to prevent a switch between the first positioning technique and the second positioning technique, when the positioning device is at the switching location, based on the amount by which the first area overlaps the second area, and based on the heading of the positioning device.

21. A method for a positioning device to generate an environment map indicating when to switch between a first positioning technology and a second positioning technology, the method comprising:

determining a first area of uncertainty surrounding a location of the positioning device;

determining, by the positioning device, environment information corresponding to the location of the positioning device;

determining an environment map based on the environment information previously collected from a plurality of positioning devices, the environment map having at least two regions separated by a second area of uncertainty surrounding at least one boundary; and determining, by the positioning device, a heading of the positioning device, wherein each of the at least two regions is associated with a respective one of the first positioning technology and the second positioning technology, and wherein the second area of uncertainty surrounding the at least one boundary is defined such that:

a switch between the first positioning technology and the second positioning technology occurs prior to the positioning device crossing the second area of uncertainty surrounding the at least one boundary based on a proportional amount by which the first area overlaps the second area and based on a heading of the positioning device.

22. The method of claim 21, wherein the uncertainty of the boundary and the location of the positioning device indicate when the switch is to occur prior to the positioning device crossing the second area of uncertainty surrounding the at least one boundary.

23. The method of claim 21, further including:

using, by the positioning device, environment information from other positioning devices to determine the environment map.

24. The method of claim 21, further including:

using, by a server, the environment information from the positioning device and other environment information from other positioning devices to determine the environment map; and sending the environment map to the positioning device.

25. The method of claim 21, further including:

determining, by the positioning device, the environment information by using at least one of dead reckoning sensors integral to the positioning device and physical characteristics of signals received by the positioning device when operating in the first positioning technology.

26. The method of claim 21, further including:

determining, by a global navigation satellite system (GNSS) receiver of the positioning device when operating in the first positioning technology, the environment information.

27. The method of claim 21, further including:

preventing switching, by the positioning device, between the first positioning technique and the second positioning technique prior to the positioning device crossing the second area of uncertainty surrounding the at least one boundary, in response to determining that the positioning device will not cross the second area of uncertainty surrounding the at least one boundary based on the proportional amount by which the first area overlaps the second area, and based on the heading of the positioning device.

* * * * *